United States Patent
Shi

(10) Patent No.: US 11,785,487 B2
(45) Date of Patent: Oct. 10, 2023

(54) COUNTING METHOD, TERMINAL DEVICE, AND APPARATUS

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/243,495

(22) Filed: Apr. 28, 2021

(65) Prior Publication Data
US 2021/0250793 A1    Aug. 12, 2021

Related U.S. Application Data

(63) Continuation of application No. PCT/CN2018/113118, filed on Oct. 31, 2018.

(51) Int. Cl.
*H04W 4/00*    (2018.01)
*H04W 24/08*    (2009.01)
*H04W 76/18*    (2018.01)
*H04L 1/1829*    (2023.01)
(Continued)

(52) U.S. Cl.
CPC .......... *H04W 24/08* (2013.01); *H04L 1/1848* (2013.01); *H04L 1/201* (2013.01); *H04W 74/0833* (2013.01); *H04W 76/18* (2018.02)

(58) Field of Classification Search
CPC . H04W 24/08; H04W 74/18; H04W 74/0833; H04W 76/18; H04W 74/004; H04W 74/0808; H04W 76/19; H04W 24/02; H04W 72/1268; H04W 72/21;
(Continued)

(56) References Cited

U.S. PATENT DOCUMENTS 6,891,819 B1 * 5/2005 Inoue .................. H04L 67/04
370/338
7,376,120 B2 * 5/2008 Miyawaki .......... H04B 7/2687
370/321
(Continued)

FOREIGN PATENT DOCUMENTS

CN    101848495 A    9/2010
CN    102067704 A    5/2011
(Continued)

OTHER PUBLICATIONS

WO, International Search Report, PCT/CN2018/113118 dated Aug. 1, 2019, 27 pages.
(Continued)

*Primary Examiner* — Thai D Hoang
(74) *Attorney, Agent, or Firm* — BAYES PLLC

(57) ABSTRACT

Disclosed in the present disclosure are a counting method, a terminal device, a chip, a computer readable storage medium, a computer program product and a computer program. The method includes maintaining at least one counter, the at least one counter being used to record how many times first indication information is received; and determining to increase a count value of a counter corresponding to the first indication information based on received first indication information.

8 Claims, 2 Drawing Sheets

201

Maintain at least one counter, wherein the at least one counter is used to record a number of times for receiving first indication information

202

Determine to increase a count value of a counter corresponding to the first indication information based on received first indication information

(51) Int. Cl.
  *H04L 1/20* (2006.01)
  *H04W 74/08* (2009.01)
(58) Field of Classification Search
  CPC .... H04W 74/008; H04L 1/1848; H04L 1/201; H04L 1/188
  USPC ................ 370/329–330, 335–345, 347–348
  See application file for complete search history.

(56) References Cited

U.S. PATENT DOCUMENTS

| | | | | |
|---|---|---|---|---|
| 8,411,588 | B2* | 4/2013 | Wu | H04W 52/0235 370/254 |
| 8,804,632 | B2* | 8/2014 | Lee | H04W 74/004 370/329 |
| 2003/0033561 | A1* | 2/2003 | Oonk | G11C 29/56 714/42 |
| 2007/0162795 | A1* | 7/2007 | Hasegawa | G11C 29/56004 714/718 |
| 2007/0274278 | A1* | 11/2007 | Choi | H04W 52/50 370/342 |
| 2010/0278131 | A1* | 11/2010 | Jeong | H04W 74/0858 370/329 |
| 2011/0021154 | A1 | 1/2011 | Marinier et al. | |
| 2013/0279451 | A1* | 10/2013 | Park | H04W 74/0833 370/329 |
| 2014/0133656 | A1* | 5/2014 | Wurster | H04W 12/08 380/270 |
| 2015/0181623 | A1* | 6/2015 | Yi | H04W 24/02 370/329 |
| 2016/0050685 | A1* | 2/2016 | Krishnamoorthi | H04W 8/183 370/329 |
| 2016/0345362 | A1 | 11/2016 | Lee et al. | |
| 2017/0006640 | A1 | 1/2017 | Dinan | |
| 2017/0006641 | A1* | 1/2017 | Dinan | H04W 74/0833 |
| 2018/0124831 | A1 | 5/2018 | Dinan | |
| 2018/0176961 | A1 | 6/2018 | Babaei et al. | |
| 2018/0242357 | A1* | 8/2018 | Khirallah | H04W 72/14 |
| 2019/0274169 | A1* | 9/2019 | Tsai | H04B 7/088 |
| 2019/0394082 | A1* | 12/2019 | Cirik | H04L 5/0048 |
| 2020/0008246 | A1* | 1/2020 | Dinan | H04W 74/0833 |
| 2020/0052769 | A1* | 2/2020 | Cirik | H04B 7/0695 |
| 2020/0100154 | A1* | 3/2020 | Cirik | H04W 36/06 |
| 2020/0100179 | A1* | 3/2020 | Zhou | G06F 1/3209 |
| 2020/0100311 | A1* | 3/2020 | Cirik | H04W 72/042 |
| 2020/0169359 | A1* | 5/2020 | Liu | H04L 1/1816 |
| 2020/0396654 | A1* | 12/2020 | Freda | H04W 36/08 |
| 2021/0153245 | A1* | 5/2021 | Tooher | H04W 72/046 |

FOREIGN PATENT DOCUMENTS

| | | | | |
|---|---|---|---|---|
| CN | 102396288 | A | 3/2012 | |
| CN | 102595603 | A | 7/2012 | |
| WO | WO-2010105148 | A1 * | 9/2010 | ............ H04B 17/20 |
| WO | 2016209059 | A1 | 12/2016 | |
| WO | 2018088422 | A1 | 5/2018 | |
| WO | WO-2019096394 | A1 * | 5/2019 | ............ H04B 17/20 |
| WO | WO-2019099463 | A1 * | 5/2019 | ........ H04W 36/0061 |

OTHER PUBLICATIONS

PCT Written Opinion of the International Searching Authority issued in corresponding International Application No. PCT/CN2018/113118 dated Aug. 1, 2019, 9 pages.

"On the impact of LBT on RA and SR procedures", Agenda item: 11.2.1.2, Source: Nokia, Nokia Shanghai Bell, 3GPP TSG-RAN WG2 Meeting #103bis R2-1814293, Chengdu, China, Oct. 8-12, 2018, 3 pages.

Extended European Search Report issued in corresponding European Application No. 18938371.4, dated Oct. 28, 2021, 14 pages.

"Draft Report of 3GPP TSG RAN WG2 meeting #93", Agenda Item: 2.2; Source: ETSI MCC; 3GPP TSG-RAN Working Group meeting #93bs, R2-16xxxx, Dubrovnik, Croatia, Apr. 11-15, 2016, 188 pages.

"Transmission counting and timer in MAC with LBT", Agenda Item: 11.2.1.1, Source:; LG Electronics Inc., 3GPP TSG-RAN WG2 Meeting #103bis, R2-1815194, Chengdu, China, Oct. 8-12, 2018, 3 pages.

First Office action issued in corresponding India Application No. 202117019775, dated Feb. 28, 2022, 7 pages.

First Office Action issued in corresponding European application No. 18938371.4, dated Jul. 27, 2022.

First Office Action issued in corresponding Chinese application No. 202110572029.7, dated Aug. 23, 2022.

First Office Action issued in corresponding Japanese application No. 2021-523625, dated Sep. 2, 2022.

Oppo, "SR transmission and procedure for NR-U", R2-1813585, 3GPP TSG-RAN WG2 Meeting #103bis 2018 Chengdu, China, Oct. 8-12, 2018.

Second Office Action issued in corresponding Japanese application No. 2021-523625, dated Mar. 31, 2023.

Third Office Action issued in corresponding European application No. 18938371.4, dated Jun. 21, 2023.

* cited by examiner

COUNTING METHOD, TERMINAL DEVICE, AND APPARATUS

CROSS-REFERENCE TO RELATED APPLICATION

This application is a continuation application of International Application No. PCT/CN2018/113118, entitled "COUNTING METHOD, TERMINAL DEVICE, AND APPARATUS" filed on Oct. 31, 2018, the entire contents of which are incorporated herein by reference.

BACKGROUND

Embodiments of the present disclosure generally relate to information processing technologies, and more particularly, to a counting method, a terminal device, a chip, a computer-readable storage medium, a computer program product and a computer program.

When Listen Before Talk (LBT) fails, the power ramping counter in the Random Access Channel (RACH) procedure will not be increased, but it is necessary to continue to discuss whether the preamble transmission counter needs to be increased. In NR-U, since a terminal device is working in an unlicensed frequency band, it is possible that the terminal device cannot find a channel due to the uncertainty of channels, that is, LBT failure occurs, which may affect the performance of uplink transmission.

SUMMARY

In order to solve the above technical problems, embodiments of the present disclosure provide a counting method, a terminal device, a chip, a computer-readable storage medium, a computer program product and a computer program.

According to a first aspect, an embodiment of the present disclosure provides counting method, applied to a terminal device, the method including: maintaining at least one counter, wherein the at least one counter is used to record how many times first indication information is received; and determining to increase a count value of a counter corresponding to the first indication information based on received first indication information.

According to a second aspect, an embodiment of the present disclosure provides terminal device, including a processing unit configured to: maintain at least one counter, wherein the at least one counter is used to record how many times first indication information is received; and determine to increase a count value of a counter corresponding to the first indication information based on received first indication information.

According to a third aspect, there is provided a terminal device, including a processor and a memory configured to store a computer program; the processor is used to call and run the computer program stored in the memory to cause the processor to perform steps of the method according to the first aspect or any implementation of the first aspect.

According to a fourth aspect, there is provided a chip configured to perform the method according to the first aspect or any implementation of the first aspect.

Specifically, the chip includes a processor which is used to call and run the computer program stored in the memory to cause a device in which the chip is installed to perform the method according to any one of the first to second aspects or any implementation of the first to second aspects.

According to a fifth aspect, there is provided a computer-readable storage medium configured to store a computer program, wherein the computer program is configured to cause a computer to perform the method according to the first aspect or any implementation of the first aspect.

According to a sixth aspect, there is provided a computer program product including computer program instructions that cause a computer to perform the method according to the first aspect or any implementation of the first aspect.

According to a seventh aspect, there is provided a computer program. When the computer program is run on a computer, the computer is caused to perform the method according to the first aspect or any implementation of the first aspect.

In technical solutions according to embodiments of the present disclosure, at least one counter is maintained, and the count value of the at least one counter can be determined based on the corresponding first indication information. In this way, when the count value of the at least one counter reaches a value, corresponding control processes may be performed, and thus a channel can be found for uplink transmissions so as to ensure the performance of the uplink transmission.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 1:
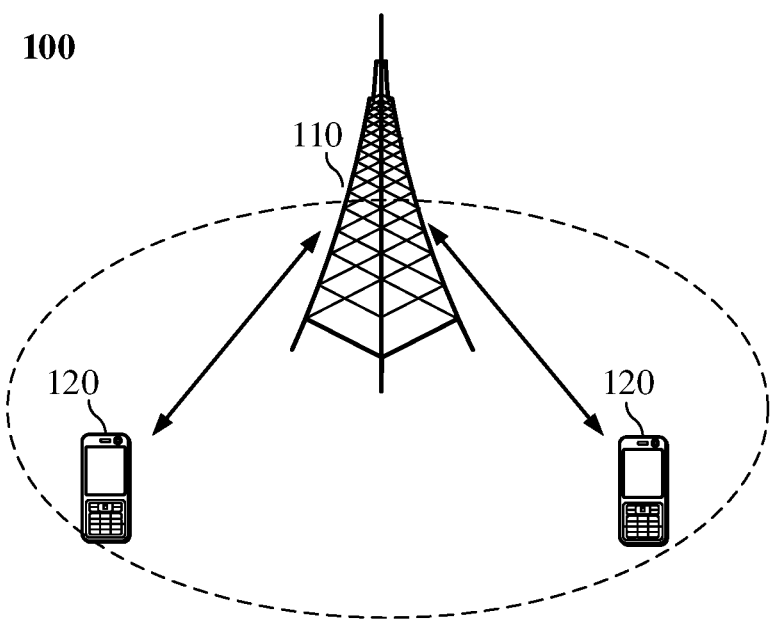
FIG. 1 is a schematic diagram of communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a network device (Base Transceiver Station, BTS) in a GSM system or a CDMA system, a network device (NodeB, NB) in a WCDMA system, an evolved network device (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM A broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable devices, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" herein describes an association relationship between associated objects, which means that there can be three relationships, for example, "A and/or B" can mean: A alone, B alone, and A and B together. In addition, the character "/" herein generally indicates that the associated objects before and after "/" are in an "or" relationship.

In order to make the characteristics and technical contents of embodiments of the present disclosure more clear, embodiments of the present disclosure will be described in detail below with reference to the accompanying drawings. The drawings are provided for illustration purposes only, and are not used to limit embodiments of the present disclosure.

First Embodiment

Figure 2:
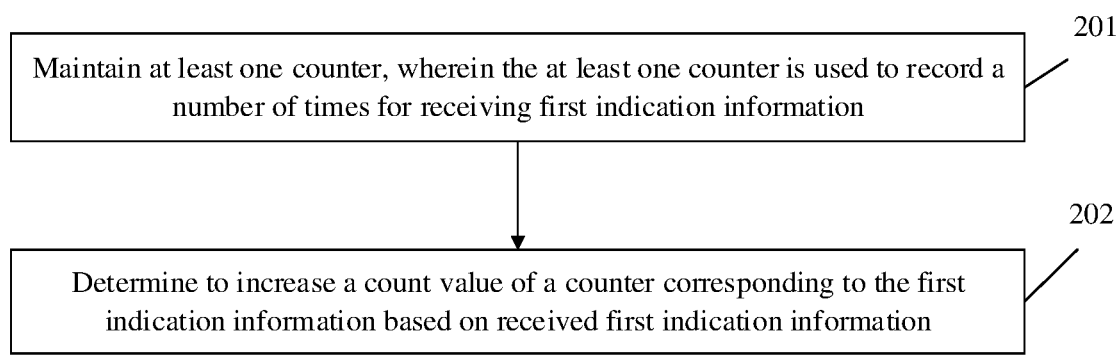
FIG. 2 is a schematic flowchart of a counting method according to an embodiment of the present disclosure.

An embodiment of the present disclosure provides a counting method, which is applied to a terminal device. As shown in FIG. 2, the method includes the following steps:

In step 201, at least one counter is maintained. The at least one counter is used to record a number of times for receiving first indication information.

In step 202, it is determined to increase a count value of a counter corresponding to the first indication information based on received first indication information.

Here, the first indication information is used to indicate one of the following: LBT failure, LBT success, SR transmission failure, preamble transmission failure, or uplink data transmission failure.

In other words, when LBT failure occurs, the first indication information sent by the physical layer (PHY) can be received, and the first indication information is used to indicate the LBT failure. Or, when the LBT succeeds, the first indication information can be received to determine that the LBT fails. Or, the first indication information may be used to determine that the SR transmission failure occurred in the uplink transmission. Or, the first indication information may be used to determine that the preamble sequence transmission fails or the uplink data transmission fails. It should be understood that the first indication information sent by the physical layer may be information received from the network side, and transmitted to the MAC layer or RRC layer through the physical layer, and then the RRC layer or the MAC layer maintains a global counter and/or at least one counter for at least one type of uplink transmission.

It should be pointed out that determining to increase a count value of a counter corresponding to the first indication information based on received first indication information in step 202 may include: increasing the count value of the counter corresponding to the first indication information regardless of the content contained in the received first indication information; or when it is determined that the first indication information is used to indicate at least one of LBT failure, SR transmission failure, preamble sequence transmission failure, or uplink data transmission failure, determining to increase the count value of the at least one counter.

In addition, the trigger of LBT may include one of the following: uplink PUCCH transmission for Scheduling Request (SR) or a HARQ feedback; uplink PUSCH transmission for data; or initiation of a RACH procedure. In other words, the LBT procedure can be triggered by uplink transmissions such as PUCCH, PUSCH or random access channel.

Regarding the aforementioned steps 201 and 202, the at least one counter includes: a global counter, and/or at least one counter for at least one type of uplink transmission.

Examples in the following scenarios are provided below:

Scenario 1: the at least one counter in this scenario is a global counter.

In this scenario, the determining to increase a count value of a counter corresponding to the first indication information based on the received first indication information includes: determining to increase the count value of the global counter based on the received first indication information.

That is, no matter the information that can be included in the first indication information indicates which kind of uplink transmission fails, the count value of the global counter is increased.

Further, in this scenario, a configured global timer corresponding to the global counter is obtained. Specifically, the network side can configure a global timer corresponding to the global counter for the terminal device.

After obtaining the configured global timer corresponding to the global counter, the method further includes when the first indication information is received, starting or restarting the global timer.

In other words, the condition for starting or restarting the global timer is that the first indication information is received. To explain further, when the network side indicates to the terminal device that a certain uplink transmission fails, the count value of the global counter is increased by 1, and the global timer is started or restarted. That is, when the global timer is not running, the global timer can be started based on the first indication information, and when the global timer has started counting, the global timer can be restarted based on the first indication information.

The global timer can be used to control the situation that the global counter has not changed its count value for a long time. For example, the current count value of the global counter has not been increased for a long time, that is to say, the uplink channel preemption and other operations have not been performed for a long time, if uplink transmission is to be performed again and a failure occurs, cumulative counting will be performed on the basis of the previously recorded count value of the global counter. However, this will cause performance problems in the uplink transmission. By adding the global timer, it is possible to reset the global counter when the global timer expires (or times out). In this way, it is possible to restart the counting of the global counter when the count value of the global counter has not been changed for a long period of time.

The method further includes when the global counter reaches a preset threshold, triggering, by a Radio Resource Control (RRC) layer, one of the following: RRC connection reestablishment; Secondary Cell Group (SCG)-Radio Link Failure (RLF) processing; or RRC reconfiguration.

The RRC reconfiguration may be at least one of the following: reconfiguration of uplink BWP, or PRACH resource reconfiguration, or PUCCH resource reconfiguration, or PUSCH resource reconfiguration, or uplink carrier reconfiguration, and so on. The SCG-RLF processing is to suspend all SCG Signaling Radio Bearers (SRBs) and Data Radio Bearer (DRB), reset the SCG Media Access Control (MAC) entity, and report the number of LBT failures to the network by MCG.

The preset threshold value may be a threshold value which is set according to actual conditions, for example, it may be set to 10, or, it may be set to other values, and embodiments of the present disclosure do not list all values here.

When the RRC connection reestablishment is initiated, a connection reestablishment request is sent to a network side. The connection reestablishment request includes: the number of LBT failures, and/or an event that triggers LBT.

That is to say, if the RRC reestablishment procedure is initiated, the terminal can further report to the network in the reestablishment request message: the number of LBT failures, and/or the event for trigger LBT, for example, the PUCCH for transmitting SR may trigger LBT, uplink data transmission may trigger LBT, or the RACH may trigger LBT, etc.

In this scenario, the global counter can be maintained at the MAC layer of the terminal device. For example, the physical layer indicates the LBT failure to the MAC, and the MAC layer triggers the execution of the aforementioned behaviors. Or, the global counter can be maintained at the RRC layer. For example, the physical layer indicates the LBT failure to the RRC layer, and the RRC layer triggers the execution of the aforementioned behaviors.

Scenario 2: the at least one counter in this scenario is at least one counter for at least one type of uplink transmission.

Unlike scenario 1, this scenario can maintain one or more counters, and can maintain the same or different counters for different uplink transmissions. That is to say, a corresponding counter can be maintained for each uplink transmission, or a counter can be maintained for a first part of the uplink transmissions, and another counter can be maintained for the remaining part of the uplink transmissions.

In this scenario, determining to increase a count value of a counter corresponding to the first indication information based on received first indication information includes: determining to increase a count value of at least part of the at least one counter based on the received first indication information.

Specifically, the at least one counter for the at least one type of uplink transmission includes at least one of the following: a first counter for SR; a second counter for PUSCH; or a third counter for RACH.

That is, in this scenario, at least one of the above three counters is included. It should be understood that the above three counters are only examples, and in actual implementations, if there are more uplink transmissions, more counters can be maintained, and embodiments of the present disclosure do not provide all the examples. It should also be pointed out that in actual implementations, there may be a situation in which a counter corresponds to one or more uplink transmissions. For example, two counters can be set, a fourth counter can be configured for SR and PUCCH, and a fifth counter can be configured for RACH. More counters can include a sixth counter corresponding to the preamble sequence, and the sixth counter is used to record how many times the preamble sequence is retransmitted in the RACH procedure. When the RACH procedure is triggered, the corresponding sixth counter is initialized to 1. When no RAR is received in the RAR window or the contention conflict is not resolved, the preamble counter is incremented by 1. A seventh counter may be included, and the seventh counter is used to record the beam failure instance indicated by the physical layer to the MAC layer, and an initial value of the seventh counter is 0.

Correspondingly, the description below is based on the foregoing three counters. Determining to increase the count value of at least part of the at least one counter based on the received first indication information includes at least one of the following: when the first indication information indicates that LBT corresponding to SR transmission fails, increasing the count value of the first counter; when the first indication information indicates that LBT corresponding to PUSCH transmission fails, increasing the count value of the second counter; or when the first indication information indicates that LBT corresponding to the RACH fails, increasing the count value of the third counter.

That is, the information contained in the first indication information indicates which kind of uplink transmission fails, and accordingly the count value of a corresponding counter is increased. It should be understood that in the case where some uplink transmissions correspond to the same counter (for example, the fourth counter is configured for SR and PUCCH, and the fifth counter is configured for RACH), if the first indication information indicates that LBT corresponding to SR transmission fails or the LBT corresponding to PUSCH transmission fails, the count value of the fourth counter is increased; and if the first indication information indicates that the LBT corresponding to the RACH fails, the count value of the fifth counter is increased. The foregoing is only some examples, and in actual implementations, there may be the cases that other uplink transmissions correspond to one counter, and embodiments of the present disclosure do not provide all the examples.

Further, in this scenario, for the first counter for SR, the second counter for PUSCH and the third counter for RACH, a first timer, a second timer, and a third timer are configured, respectively. The first timer, the second timer, and the third timer can be different timers configured by the network side. It should be pointed out that different timers are configured for different counters, that is, different timers are configured for at least one counter of at least one type of uplink transmission. According to some embodiments, the durations of different timers can be the same or different.

After the configured timer is obtained, the method further includes when the uplink transmission corresponding to the first indication information fails, restarting or starting the corresponding timer.

Specifically, the method further includes one of the following: when the received first indication information indicates that LBT corresponding to SR transmission fails, starting or restarting the first timer; when the received first indication information indicates that LBT corresponding to PUSCH transmission fails, starting or restarting the second timer; or when the received first indication information indicates that LBT corresponding to the RACH has fails, starting or restarting the third timer.

In other words, the global timer can be used to control the situation that the certain counter has not changed its count value for a long time. For example, the current count value of a certain counter has not been increased for a long time, that is to say, the uplink channel preemption and other operations have not been performed for a long time, if uplink transmission is to be performed again and a failure occurs, cumulative counting will be performed on the basis of the previously recorded count value of the certain counter. However, this will cause performance problems in the uplink transmission. By adding the certain timer, it is possible to reset the corresponding counter when the certain timer expires (or times out). In this way, it is possible to restart the counting of the counter when the count value of the certain counter has not been changed for a long period of time.

The method further includes: configuring at least one threshold value for the at least one counter for the at least one type of uplink transmission.

When a count value of a counter in the at least one counter exceeds a corresponding threshold, at least part of the following processing is performed: notifying an RRC layer to trigger RRC reestablishment; notifying the RRC layer to trigger RRC reconfiguration; notifying the RRC layer to release all configured PUCCH resources; notifying the RRC layer to release all SRS; clearing all configured downlink assignments and uplink grants; initiating a RACH procedure; notifying a network side of a number of LBT failures; or notifying the network side of an event that triggers LBT.

The RRC reconfiguration may be at least one of the following: reconfiguration of uplink BWP, or PRACH resource reconfiguration, or PUCCH resource reconfiguration, or PUSCH resource reconfiguration, or uplink carrier reconfiguration, and so on. The SCG-RLF processing is to suspend all SCG Signaling Radio Bearers (SRBs) and Data Radio Bearer (DRB), reset the SCG Media Access Control (MAC) entity, and report the number of LBT failures to the network by MCG.

The preset threshold value may be a threshold value which is set according to actual conditions, for example, it may be set to 10, or, it may be set to other values, and embodiments of the present disclosure do not list all values here.

When the RRC connection reestablishment is initiated, a connection reestablishment request is sent to a network side. The connection reestablishment request includes: the number of LBT failures, and/or an event that triggers LBT.

It should be pointed out that in this scenario, different processing can be set for different counters. For example, for the first counter, when the count value exceeds the threshold, the following processes can be performed: notifying the RRC layer to trigger RRC reconfiguration; notifying the RRC layer to release all configured PUCCH resources; notifying the RRC layer to release all SRS; clearing all configured downlink assignments and uplink grants. For the second counter, when the count value exceeds the threshold, the process of notifying the RRC layer to trigger the RRC reconfiguration is executed. For the third counter, when the count value exceeds the threshold, the process of notifying the RRC layer to release all SRSs and clearing all configured downlink assignments and uplink grants can be performed. It needs to be understood that different counters are configured with different processes; alternatively, the same process can be set for all the counters, and embodiments of the present disclosure do not impose specific limitations on this.

In this scenario, the global counter can be maintained at the MAC layer of the terminal device. For example, the physical layer indicates the LBT failure to the MAC layer, and the MAC layer triggers the execution of the aforementioned behaviors. Or, the global counter can be maintained at the RRC layer. For example, the physical layer indicates the LBT failure to the RRC layer, and the RRC layer triggers the execution of the aforementioned behaviors.

Finally, in combination with the scenarios 1 and 2, it should be noted that the global counter and the at least one counter for at least one type of uplink transmission can be maintained at the same time. For example, there may be a situation where the global counter for the global uplink transmission can be maintained currently, and it is also possible to maintain one counter for one or several uplink transmissions, or to maintain individual counters for individual uplink transmissions of the one or several uplink transmissions. That is to say, the scenarios 1 and 2 can exist at the same time; and, when they exist at the same time, respective processes for the scenarios can be performed, and repeated descriptions are omitted here.

In technical solutions according to embodiments of the present disclosure, at least one counter is maintained, and the count value of the at least one counter can be determined based on the corresponding first indication information. In this way, when the count value of the at least one counter reaches a value, corresponding control processes may be performed, and thus a channel can be found for uplink transmissions so as to ensure the performance of the uplink transmissions.

Second Embodiment

Figure 3:
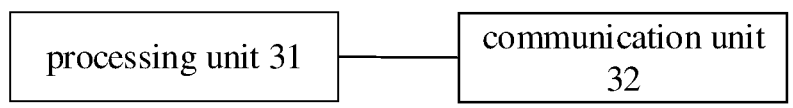
FIG. 3 is a schematic diagram showing the structure of a terminal device according to an embodiment of the present disclosure.

An embodiment of the present disclosure provides a terminal device. As shown in FIG. 3, the terminal device includes a processing unit 31.

The processing unit 31 is configured to: maintain at least one counter, wherein the at least one counter is used to record how many times first indication information is received; determine to increase a count value of a counter corresponding to the first indication information based on received first indication information.

Here, the first indication information is used to indicate one of the following: LBT failure, LBT success, SR transmission failure, preamble sequence transmission failure, or uplink data transmission failure.

In other words, when LBT failure occurs, the first indication information sent by the physical layer (PHY) can be received, and the first indication information is used to indicate the LBT failure. Or, when the LBT succeeds, the first indication information can be received to determine that the LBT fails. Or, the first indication information may be used to determine that the SR transmission failure occurred in the uplink transmission. Or, the first indication information may be used to determine that the preamble sequence transmission fails or the uplink data transmission fails. It should be understood that the first indication information sent by the physical layer may be information received from the network side, and transmitted to the MAC layer or RRC layer through the physical layer, and then the RRC layer or the MAC layer maintains a global counter and/or at least one counter for at least one type of uplink transmission.

It should be pointed out that determining to increase a count value of a counter corresponding to the first indication information based on received first indication information performed by the processing unit 31 may include: increasing the count value of the counter corresponding to the first indication information regardless of the content contained in the received first indication information; or when it is determined that the first indication information is used to indicate at least one of LBT failure, SR transmission failure, preamble sequence transmission failure, or uplink data transmission failure, determining to increase the count value of the at least one counter.

In addition, the trigger of LBT may include one of the following: uplink PUCCH transmission for Scheduling Request (SR) or a HARQ feedback; uplink PUSCH transmission for data; or initiation of a RACH procedure. In other words, the LBT procedure can be triggered by uplink transmissions such as PUCCH, PUSCH or random access channel.

The at least one counter includes: a global counter, and/or at least one counter for at least one type of uplink transmission.

Examples in the following scenarios are provided below:
Scenario 1: the at least one counter in this scenario is a global counter.

In this scenario, the processing unit 31 is configured to: determine to increase the count value of the global counter based on the received first indication information.

That is, no matter the information that can be included in the first indication information indicates which kind of uplink transmission fails, the count value of the global counter is increased.

Further, in this scenario, the terminal device further includes a communication unit 32 which is configured to obtain a configured global timer corresponding to the global counter. Specifically, the network side can configure a global timer corresponding to the global counter for the terminal device.

After obtaining the configured global timer corresponding to the global counter, the processing unit 31 is further configured to: when the first indication information is received, start or restart the global timer.

In other words, the condition for starting or restarting the global timer is that the first indication information is received. To explain further, when the network side indicates to the terminal device that a certain uplink transmission fails, the count value of the global counter is increased by 1, and the global timer is started or restarted. That is, when the global timer is not running, the global timer can be started based on the first indication information, and when the global timer has started counting, the global timer can be restarted based on the first indication information.

The global timer can be used to control the situation that the global counter has not changed its count value for a long time. For example, the current count value of the global counter has not been increased for a long time, that is to say, the uplink channel preemption and other operations have not been performed for a long time, if uplink transmission is to be performed again and a failure occurs, cumulative counting will be performed on the basis of the previously recorded count value of the global counter. However, this will cause performance problems in the uplink transmission. By adding the global timer, it is possible to reset the global counter when the global timer expires (or times out). In this way, it is possible to restart the counting of the global counter when the count value of the global counter has not been changed for a long period of time.

The processing unit 31 is further configured to: when the global counter reaches a preset threshold, control a Radio Resource Control (RRC) layer to trigger one of the following: RRC connection reestablishment; Secondary Cell Group (SCG)-Radio Link Failure (RLF) processing; or RRC reconfiguration.

The RRC reconfiguration may be at least one of the following: reconfiguration of uplink BWP, or PRACH resource reconfiguration, or PUCCH resource reconfiguration, or PUSCH resource reconfiguration, or uplink carrier reconfiguration, and so on. The SCG-RLF processing is to suspend all SCG Signaling Radio Bearers (SRBs) and Data Radio Bearer (DRB), reset the SCG Media Access Control (MAC) entity, and report the number of LBT failures to the network by MCG.

The preset threshold value may be a threshold value which is set according to actual conditions, for example, it may be set to 10, or, it may be set to other values, and embodiments of the present disclosure do not list all values here.

When the processing unit 31 initiates the RRC connection reestablishment, the communication unit 32 sends a connection reestablishment request to a network side. The connection reestablishment request includes: the number of LBT failures, and/or an event that triggers LBT.

That is to say, if the RRC reestablishment procedure is initiated, the terminal can further report to the network in the reestablishment request message: the number of LBT failures, and/or the event for trigger LBT, for example, the PUCCH for transmitting SR may trigger LBT, uplink data transmission may trigger LBT, or the RACH may trigger LBT, etc.

In this scenario, the global counter can be maintained at the MAC layer of the terminal device. For example, the physical layer indicates the LBT failure to the MAC, and the MAC layer triggers the execution of the aforementioned behaviors. Or, the global counter can be maintained at the RRC layer. For example, the physical layer indicates the LBT failure to the RRC layer, and the RRC layer triggers the execution of the aforementioned behaviors.

Scenario 2: the at least one counter in this scenario is at least one counter for at least one type of uplink transmission.

Unlike scenario 1, this scenario can maintain one or more counters, and can maintain the same or different counters for different uplink transmissions. That is to say, a corresponding counter can be maintained for each uplink transmission, or a counter can be maintained for a first part of the uplink transmissions, and another counter can be maintained for the remaining part of the uplink transmissions.

In this scenario, the processing unit 31 is configured to: determine to increase a count value of at least part of the at least one counter based on the received first indication information.

Specifically, the at least one counter for the at least one type of uplink transmission includes at least one of the following: a first counter for SR; a second counter for PUSCH; or a third counter for RACH.

That is, in this scenario, at least one of the above three counters is included. It should be understood that the above three counters are only examples, and in actual implementations, if there are more uplink transmissions, more counters can be maintained, and embodiments of the present disclosure do not provide all the examples. It should also be pointed out that in actual implementations, there may be a situation in which a counter corresponds to one or more uplink transmissions. For example, two counters can be set, a fourth counter can be configured for SR and PUCCH, and a fifth counter can be configured for RACH. More counters can include a sixth counter corresponding to the preamble sequence, and the sixth counter is used to record how many times the preamble sequence is retransmitted in the RACH procedure. When the RACH procedure is triggered, the corresponding sixth counter is initialized to 1. When no RAR is received in the RAR window or the contention conflict is not resolved, the preamble counter is incremented by 1. A seventh counter may be included, and the seventh counter is used to record the beam failure instance indicated by the physical layer to the MAC layer, and an initial value of the seventh counter is 0.

Correspondingly, the description below is based on the foregoing three counters. Determining to increase the count value of at least part of the at least one counter based on the received first indication information performed by the processing unit 31 includes at least one of the following: when the first indication information indicates that LBT corresponding to SR transmission fails, increasing the count value of the first counter; when the first indication information indicates that LBT corresponding to PUSCH transmission fails, increasing the count value of the second counter; or when the first indication information indicates that LBT corresponding to the RACH fails, increasing the count value of the third counter.

That is, the information contained in the first indication information indicates which kind of uplink transmission fails, and accordingly the count value of a corresponding counter is increased. It should be understood that in the case where some uplink transmissions correspond to the same counter (for example, the fourth counter is configured for SR and PUCCH, and the fifth counter is configured for RACH), if the first indication information indicates that LBT corresponding to SR transmission fails or the LBT corresponding to PUSCH transmission fails, the count value of the fourth counter is increased; and if the first indication information indicates that the LBT corresponding to the RACH fails, the count value of the fifth counter is increased. The foregoing is only some examples, and in actual implementations, there may be the cases that other uplink transmissions correspond to one counter, and embodiments of the present disclosure do not provide all the examples.

Further, in this scenario, for the first counter for SR, the second counter for PUSCH and the third counter for RACH, a first timer, a second timer, and a third timer are configured, respectively. The first timer, the second timer, and the third timer can be different timers configured by the network side. It should be pointed out that different timers are configured for different counters, that is, different timers are configured for at least one counter of at least one type of uplink transmission. According to some embodiments, the durations of different timers can be the same or different.

After the configured timer is obtained, when the uplink transmission corresponding to the first indication information fails, the processing unit 31 restarts or starts the corresponding timer.

Specifically, the processing unit 31 is further configured to perform one of the following: when the received first indication information indicates that LBT corresponding to SR transmission fails, starting or restarting the first timer; when the received first indication information indicates that LBT corresponding to PUSCH transmission fails, starting or restarting the second timer; or when the received first indication information indicates that LBT corresponding to the RACH has fails, starting or restarting the third timer.

In other words, the global timer can be used to control the situation that the certain counter has not changed its count value for a long time. For example, the current count value of a certain counter has not been increased for a long time, that is to say, the uplink channel preemption and other operations have not been performed for a long time, if uplink transmission is to be performed again and a failure occurs, cumulative counting will be performed on the basis of the previously recorded count value of the certain counter. However, this will cause performance problems in the uplink transmission. By adding the certain timer, it is possible to reset the corresponding counter when the certain timer expires (or times out). In this way, it is possible to restart the counting of the counter when the count value of the certain counter has not been changed for a long period of time.

The processing unit 31 is configured to: configure at least one threshold value for the at least one counter for the at least one type of uplink transmission.

The processing unit 31 is configured to, when a count value of a counter in the at least one counter exceeds a corresponding threshold, perform at least part of the following processing: notifying an RRC layer to trigger RRC reestablishment; notifying the RRC layer to trigger RRC reconfiguration; notifying the RRC layer to release all configured PUCCH resources; notifying the RRC layer to release all SRS; clearing all configured downlink assignments and uplink grants; initiating a RACH procedure; notifying a network side of a number of LBT failures; or notifying the network side of an event that triggers LBT.

The RRC reconfiguration may be at least one of the following: reconfiguration of uplink BWP, or PRACH resource reconfiguration, or PUCCH resource reconfiguration, or PUSCH resource reconfiguration, or uplink carrier reconfiguration, and so on. The SCG-RLF processing is to suspend all SCG Signaling Radio Bearers (SRBs) and Data Radio Bearer (DRB), reset the SCG Media Access Control (MAC) entity, and report the number of LBT failures to the network by MCG.

The preset threshold value may be a threshold value which is set according to actual conditions, for example, it may be set to 10, or, it may be set to other values, and embodiments of the present disclosure do not list all values here.

When the RRC connection reestablishment is initiated, a connection reestablishment request is sent to a network side. The connection reestablishment request includes: the number of LBT failures, and/or an event that triggers LBT.

It should be pointed out that in this scenario, different processing can be set for different counters. For example, for the first counter, when the count value exceeds the threshold, the following processes can be performed: notifying the RRC layer to trigger RRC reconfiguration; notifying the RRC layer to release all configured PUCCH resources; notifying the RRC layer to release all SRS; clearing all configured downlink assignments and uplink grants. For the second counter, when the count value exceeds the threshold, the process of notifying the RRC layer to trigger the RRC reconfiguration is executed. For the third counter, when the count value exceeds the threshold, the process of notifying the RRC layer to release all SRSs and clearing all configured downlink assignments and uplink grants can be performed. It needs to be understood that different counters are configured with different processes; alternatively, the same process can be set for all the counters, and embodiments of the present disclosure do not impose specific limitations on this.

In this scenario, the global counter can be maintained at the MAC layer of the terminal device. For example, the physical layer indicates the LBT failure to the MAC layer, and the MAC layer triggers the execution of the aforementioned behaviors. Or, the global counter can be maintained at the RRC layer. For example, the physical layer indicates the LBT failure to the RRC layer, and the RRC layer triggers the execution of the aforementioned behaviors.

Finally, in combination with the scenarios 1 and 2, it should be noted that the global counter and the at least one counter for at least one type of uplink transmission can be maintained at the same time. For example, there may be a situation where the global counter for the global uplink transmission can be maintained currently, and it is also possible to maintain one counter for one or several uplink transmissions, or to maintain individual counters for individual uplink transmissions of the one or several uplink transmissions. That is to say, the scenarios 1 and 2 can exist at the same time; and, when they exist at the same time, respective processes for the scenarios can be performed, and repeated descriptions are omitted here.

In technical solutions according to embodiments of the present disclosure, at least one counter is maintained, and the count value of the at least one counter can be determined based on the corresponding first indication information. In this way, when the count value of the at least one counter reaches a value, corresponding control processes may be performed, and thus a channel can be found for uplink transmissions so as to ensure the performance of the uplink transmissions.

Figure 4:
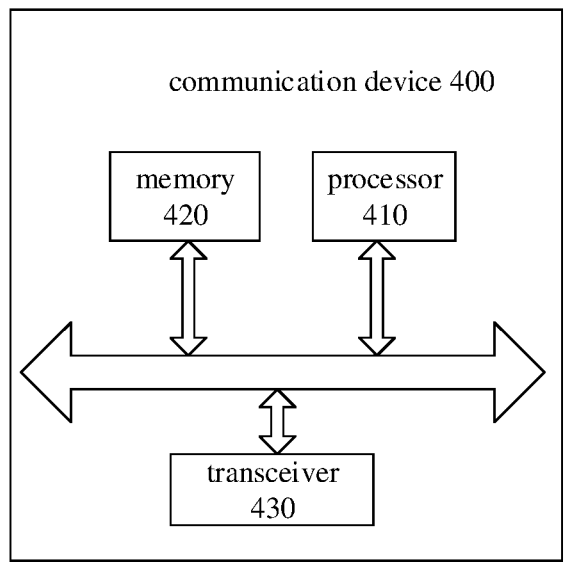
FIG. 4 is a schematic diagram showing the composition structure of a communication device according to an embodiment of the present disclosure.

FIG. 4 is a schematic structural diagram of a communication device 400 according to an embodiment of the present disclosure. The communication device can be the terminal device or the network device in the previous embodiments. The communication device 400 shown in FIG. 4 includes a processor 410, and the processor 410 may call and run a computer program from a memory to perform the method in embodiments of the present disclosure.

According to embodiments, as shown in FIG. 4, the communication device 400 may further include a memory 420. The processor 410 may call and run a computer program from the memory 420 to perform the method in embodiments of the present disclosure.

The memory 420 may be a separate device independent of the processor 410, or may be integrated in the processor 410.

According to embodiments, as shown in FIG. 4, the communication device 400 may further include a transceiver 430, and the processor 410 may control the transceiver 430 to communicate with other devices. Specifically, the transceiver may send information or data to other devices, or receive information or data sent by other devices.

The transceiver 430 may include a transmitter and a receiver. The transceiver 430 may further include one or more antennas.

According to embodiments, the communication device 400 may specifically be the network device according to an embodiment of the present disclosure, and the communication device 400 may implement the corresponding processes implemented by the network device in the method embodiments of the present disclosure. For brevity, details are not repeated here.

According to embodiments, the communication device 400 may specifically be the mobile terminal/terminal device in embodiments of the present disclosure, and the communication device 400 may implement the corresponding processes implemented by the mobile terminal/terminal device in the method embodiments of the present disclosure. For brevity, details are not repeated here.

Figure 5:
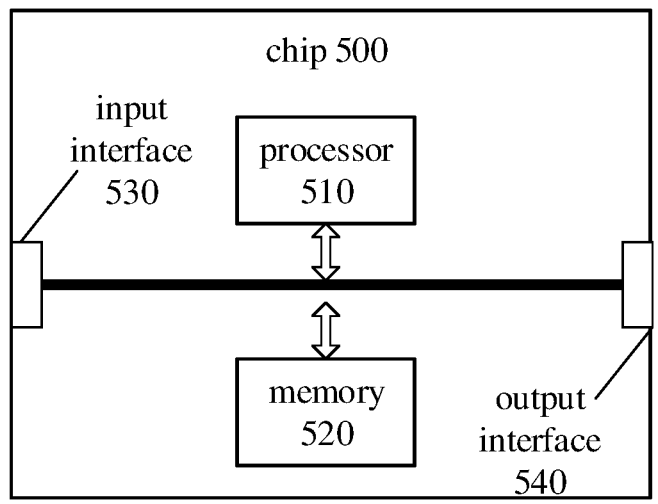
FIG. 5 is a schematic block diagram of a chip according to an embodiment of the present disclosure.

FIG. 5 is a schematic structural diagram of a chip according to an embodiment of the present disclosure. The chip 500 shown in FIG. 5 includes a processor 510, and the processor 510 can call and run a computer program from a memory to implement the method according to embodiments of the present disclosure.

According to embodiments, as shown in FIG. 5, the chip 500 may further include a memory 520. The processor 510 may call and run a computer program from the memory 520 to implement the method according to embodiments of the present disclosure.

The memory 520 may be a separate device independent of the processor 510, or may be integrated in the processor 510.

According to embodiments, the chip 500 may further include an input interface 530. The processor 510 may control the input interface 530 to communicate with other devices or chips, and specifically, the processor 510 can control the input interface to obtain information or data sent by other devices or chips.

According to embodiments, the chip 500 may further include an output interface 540. The processor 510 can control the output interface 540 to communicate with other devices or chips, and specifically, the processor 510 can control the output interface 540 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the terminal device in embodiments of the present disclosure, and the chip can implement the corresponding processes implemented by the terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 6:
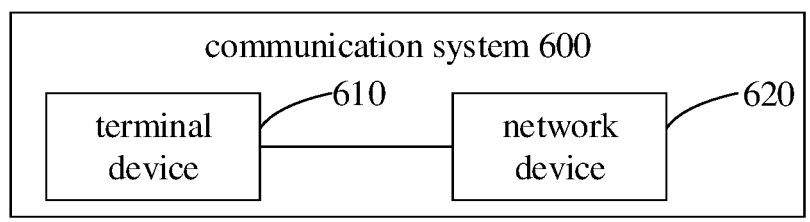
FIG. 6 is a schematic diagram of communication system architecture according to an embodiment of the present disclosure.

FIG. 6 is a schematic block diagram of a communication system 600 according to an embodiment of the present disclosure. As shown in FIG. 6, the communication system 600 includes a terminal device 610 and a network device 620.

The terminal device 610 may be used to implement the corresponding functions implemented by the terminal device in the foregoing methods, and the network device 620 may be used to implement the corresponding functions implemented by the network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/ terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for counting, applied to a terminal device, comprising:
    maintaining, at an RRC layer or a MAC layer, a global counter, wherein the global counter is used to record how many times first indication information is received by the RRC layer or the MAC layer; and
    determining to increase a count value of the global counter based on received first indication information,
    wherein the first indication information received by the RRC layer or the MAC layer indicates one of the following uplink transmission failure kinds: LBT failure, SR transmission failure, preamble sequence transmission failure, or uplink data transmission failure, no matter of which kind of uplink transmission failure is indicated by the first indication information received by the RRC layer or the MAC layer, the count value of the global counter is increased;
    wherein a configured global timer corresponding to the global counter is obtained,
    wherein after the configured global timer corresponding to the global counter is obtained, when the first indication information is received, the global timer is started or restarted, and
    wherein the method further comprises when the global counter reaches a preset threshold, triggering, by a Radio Resource Control (RRC) layer, RRC connection reestablishment.

2. The method according to claim 1, wherein after starting or restarting the global timer, the method further comprises:
    when the global timer times out, resetting the global counter.

3. The method according to claim 1, further comprising:
    when the RRC connection reestablishment is initiated, initiating a connection reestablishment request to a network side,
    wherein the connection reestablishment request comprises at least one of a number of LBT failures, or an event that triggers LBT.

4. The method of claim 1, wherein in response to that the first indication information received by the RRC layer or the MAC layer indicates one of the following uplink transmission failure kinds, the count value of the global counter is increased by 1;
    and wherein in response to that first indication information subsequently received by the RRC layer or the MAC layer indicates another one of the following uplink transmission failure kinds, the count value of the global counter is increased by 1.

5. A terminal device, comprising a processor and a memory, wherein the memory is configured to store a computer program, and the processor is configured to call and run the computer program stored in the memory to cause the terminal device to:
  maintain, at an RRC layer or a MAC layer, a global counter, wherein the global counter is used to record how many times first indication information is received by the RRC layer or the MAC layer; and
  determine to increase a count value of the global counter based on received first indication information,
  wherein the first indication information received by the RRC layer or the MAC layer indicates one of the following uplink transmission failure kinds: LBT failure, SR transmission failure, preamble sequence transmission failure, or uplink data transmission failure, no matter of which kind of uplink transmission failure is indicated by the first indication information received by the RRC layer or the MAC layer, the count value of the global counter is increased;
  wherein a configured global timer corresponding to the global counter is obtained, wherein after the configured global timer corresponding to the global counter is obtained, when the first failure indication information is received, the global timer is started or restarted, and
  wherein the processor is further configured to call and run the computer program stored in the memory to cause the terminal device to, when the global counter reaches a preset threshold, control a Radio Resource Control (RRC) layer to trigger RRC connection reestablishment.

6. The terminal device according to claim 5, wherein the processor is configured to call and run the computer program stored in the memory to cause the terminal device to:
  when the global timer times out, reset the global counter.

7. The terminal device according to claim 5, wherein the processor is configured to call and run the computer program stored in the memory to cause the terminal device to:
  when the RRC connection reestablishment is initiated, control a communication to initiate a connection reestablishment request to a network side,
  wherein the connection reestablishment request comprises at least one of a number of LBT failures, or an event that triggers LBT.

8. The terminal device of claim 5, wherein in response to that the first indication information received by the RRC layer or the MAC layer indicates one of the following uplink transmission failure kinds, the count value of the global counter is increased by 1;
  and wherein in response to that first indication information subsequently received by the RRC layer or the MAC layer indicates another one of the following uplink transmission failure kinds, the count value of the global counter is increased by 1.

* * * * *